United States Patent
Kotra et al.

(10) Patent No.: US 12,019,547 B2
(45) Date of Patent: Jun. 25, 2024

(54) DISPATCH BANDWIDTH OF MEMORY-CENTRIC REQUESTS BY BYPASSING STORAGE ARRAY ADDRESS CHECKING

(71) Applicant: Advanced Micro Devices, Inc., Santa Clara, CA (US)

(72) Inventors: Jagadish B. Kotra, Austin, TX (US); John Kalamatianos, Boxborough, MA (US); Gagandeep Panwar, Blacksburg, VA (US)

( * ) Notice: Subject to any disclaimer, the term of this patent is extended or adjusted under 35 U.S.C. 154(b) by 0 days.

(21) Appl. No.: 17/386,115

(22) Filed: Jul. 27, 2021

(65) Prior Publication Data

US 2023/0030679 A1 Feb. 2, 2023

(51) Int. Cl.
| | |
|---|---|
| G06F 12/08 | (2016.01) |
| G06F 9/30 | (2018.01) |
| G06F 12/02 | (2006.01) |
| G06F 12/06 | (2006.01) |
| G06F 12/0815 | (2016.01) |
| G06F 12/0817 | (2016.01) |

(52) U.S. Cl.
CPC ...... *G06F 12/0815* (2013.01); *G06F 9/30047* (2013.01); *G06F 12/0238* (2013.01); *G06F 12/0653* (2013.01); *G06F 12/0817* (2013.01)

(58) Field of Classification Search
CPC ............. G06F 12/0238; G06F 9/30047; G06F 12/0653; G06F 12/0817; G06F 12/08; G06F 12/0815
See application file for complete search history.

(56) References Cited

U.S. PATENT DOCUMENTS

| | | | | |
|---|---|---|---|---|
| 2014/0258620 | A1* | 9/2014 | Nagarajan | G06F 12/0815 711/120 |
| 2016/0124883 | A1* | 5/2016 | Thompson | G06F 13/404 710/110 |

OTHER PUBLICATIONS

Moving Processing to Data on the Influence of Processing in Memory on Data Management by Vincon (Year: 2019).*
Near Data Processing for Efficient and Trusted Systems by Aga (Year: 2018).*

(Continued)

*Primary Examiner* — Paul M Knight
(74) *Attorney, Agent, or Firm* — Hickman Becker Bingham Ledesma LLP

(57) ABSTRACT

A technical solution to the technical problem of how to improve dispatch throughput for memory-centric commands bypasses address checking for certain memory-centric commands. Implementations include using an Address Check Bypass (ACB) bit to specify whether address checking should be performed for a memory-centric command. ACB bit values are specified in memory-centric instructions, automatically specified by a process, such as a compiler, or by host hardware, such as dispatch hardware, based upon whether a memory-centric command explicitly references memory. Implementations include bypassing, i.e., not performing, address checking for memory-centric commands that do not access memory and also for memory-centric commands that do access memory, but that have the same physical address as a prior memory-centric command that explicitly accessed memory to ensure that any data in caches was flushed to memory and/or invalidated.

19 Claims, 3 Drawing Sheets

(56) References Cited

OTHER PUBLICATIONS

Toward Standardized Near-Data Processing with Unrestricted Data Placement for GPUs by Kim (Year: 2017).*
Practical Near-Data Processing for In-memory Analytics Frameworks by Gao (Year: 2015).*
Towards Near-Data Processing of Compare Operations in 3D-Stacked Memory by Das (Year: 2018).*
LazyPIM: An Efficient Cache Coherence Mechanism for Processing-in-Memory by Boroumand (Year: 2017).*
CoNDA: Efficient Cache Coherence Support for Near-Data Accelerators by Boroumand (Year: 2019).*
It's Time to Think About an Operating System for Near Data Processing Architectures by Barbalace (Year: 2017).*
An Overview of In-memory Processing with Emerging Non-volatile Memory for Data-intensive Applications by Li (Year: 2019).*
PIM-Enabled Instructions: A Low-Overhead, Locality-Aware Processing-in-Memory Architecture by Ahn (Year: 2015).*
The Processing-in-Memory Model by Kang Jul. 8, 2021 (Year: 2021).*

* cited by examiner

DISPATCH BANDWIDTH OF MEMORY-CENTRIC REQUESTS BY BYPASSING STORAGE ARRAY ADDRESS CHECKING

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers that allow some computations to be performed locally in memory, such as arithmetic computations. This allows a memory controller to trigger local computations at multiple memory modules in parallel without requiring data movement across the memory module interface, which can greatly improve performance, particularly for data-intensive workloads.

One of the technical problems of offloading computations to memory, for example using PIM technology, is that while it reduces data bus traffic and computational burdens on processors, additional steps must be performed to ensure functional correctness. These additional steps include performing address checking at one or more cache controllers or a coherence directory controller to determine whether any processor-side caches store data for an address that corresponds to a memory-centric command and then flushing and/or invalidating any identified data. More specifically, if a cache stores dirty data for an address accessed by a memory-centric command, the dirty data must be flushed from the cache to memory to ensure that the memory-centric operation operates on the most recent version of data. If the cache stores clean data for the memory-centric command that updated this data, the clean data must be invalidated to ensure that subsequent processor-side, compute-centric operations retrieve the results of the memory-centric operations from memory instead of using stale data from cache.

These additional steps consume processing resources on the critical path of dispatching memory-centric requests to PIM devices and must be performed for every memory-centric command, even those that do not access memory. For example, the process must be performed even for memory-centric commands that access only local registers in a PIM device and not memory. Valuable processing resources are therefore wasted when address checking is performed for memory-centric commands that do not access data from memory. The same issues apply to Processing Near Memory (PNM) technologies. There is, therefore, a need for a solution to the technical problem of how to improve dispatch throughput for memory-centric requests, and in particular, memory-centric requests that do not access memory.

BRIEF DESCRIPTION OF THE DRAWINGS

Implementations are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the implementations. It will be apparent, however, to one skilled in the art that the implementations are practiced without these specific details. In other instances, well-known structures and devices are shown in block diagram form in order to avoid unnecessarily obscuring the implementations.

I. Overview
II. Dispatch Architecture
III. Bypassing Address Checking for Memory-Centric Commands That Do Not Access Memory
IV. Bypassing Address Checking for Memory-Centric Commands That Do Access Memory
   A. Address Check Bypass (ACB) Bits
   B. Using an Address Buffer

I. Overview

A technical solution to the technical problem of how to improve dispatch throughput for memory-centric commands bypasses address checking for certain memory-centric commands. As used herein, the term "address checking" refers to a check performed by a storage array controller, such as a coherence directory controller, one or more cache controllers, etc., to determine whether data for a particular address is stored in a processor side cache. Implementations include using an Address Check Bypass (ACB) bit to specify whether address checking should be performed for a memory-centric command. ACB bit values are manually specified in memory-centric instructions, automatically specified by a process, such as a compiler, or by host hardware, such as dispatch hardware, based upon whether a memory-centric command explicitly references memory. Implementations include bypassing, i.e., not performing, address checking for memory-centric commands that do not access memory and also for memory-centric commands that do access memory, but that have the same physical address as a prior memory-centric command that explicitly accessed memory to ensure that any data in caches was flushed to memory and/or invalidated.

The solution provides the benefit of improved dispatch throughput by bypassing address checking for memory-centric requests that do not access memory, such as memory-centric requests that access only memory-side registers, such as PIM or PNM registers. Improved dispatch throughput is also improved by bypassing address checking for memory-centric commands that do access memory but that have the same physical address as a prior memory-centric command. Thus, the normal processing overhead required to perform address checking for memory-centric requests is avoided for memory-centric requests that do not access memory and/or for memory-centric requests that do access memory but that have the same physical address as a prior memory-centric command that accessed memory. The approach also provides fine-grained control to specify when address checking should be bypassed for particular memory-centric instructions.

II. Dispatch Architecture

Figure 1:
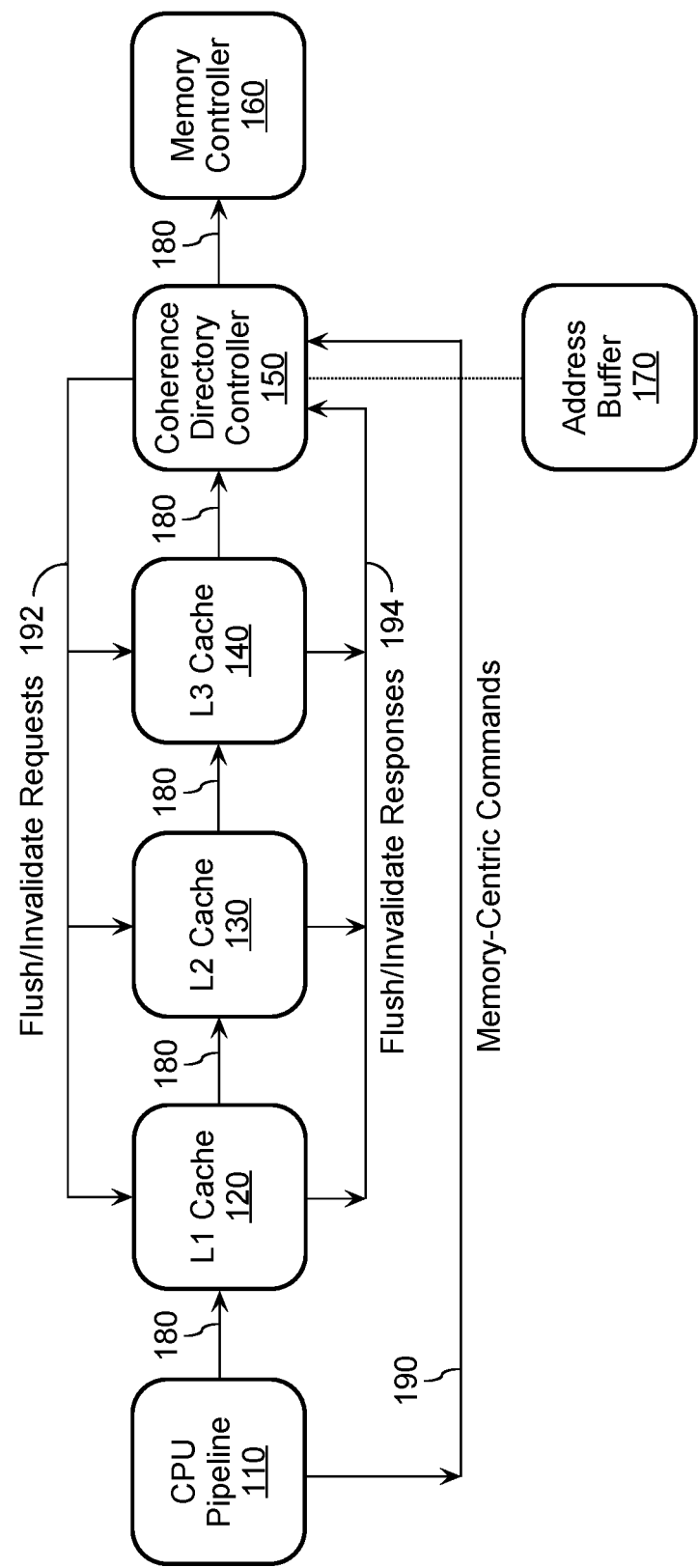
FIG. 1 depicts an example cache architecture.

FIG. 1 depicts an example dispatch architecture 100 that includes a CPU pipeline 110, a Level 1 (L1) cache 120, a Level 2 (L2) cache 130, a Level 3 (L3) cache 140, a coherence directory controller 150, a memory controller 160, and an address buffer 170. The CPU pipeline 110 includes fewer or additional elements depending upon a particular implementation.

Compute or core-centric requests originate at the CPU pipeline 110 and follow a dispatch flow 180 to the L1 cache 120, the L2 cache 130, the L3 cache 140, the coherence directory controller 150, and lastly to the memory controller 160 and then on to memory, in situations where the requested data is not available in any of the caches, or where the core-centric request stores data to memory. Memory-centric requests originate at the CPU pipeline and follow a dispatch flow 190 that bypasses the L1 cache 120, the L2 cache 130 and the L3 cache 140 to reach the coherence directory controller 150.

The coherence directory controller 150 includes processing logic to issue flush/invalidate requests 192, also known as "probe requests," to the L1 cache 120, the L2 cache 130 and the L3 cache 140 to cause dirty copies of data for addresses corresponding to the memory-centric requests to be flushed to memory and clean copies of data for addresses corresponding to the memory-centric requests to be invalidated. The processing logic is implemented by any mechanism capable of processing memory-centric commands in the manner described herein including computer hardware, computer software, or any combination of computer hardware and computer software. The L1 cache 120, the L2 cache 130 and the L3 cache 140 issue flush/invalidate responses 194, also known as "probe responses," to the coherence directory controller 150 to provide their copy of dirty data or to confirm invalidation, depending upon the particular coherence protocol employed. Although implementations are described herein in the context of directory-based cache coherence protocols, implementations are applicable to other types of coherence protocols, such as snooping-based cache coherence protocols.

Flushing/invalidating cache data in this manner ensures that the memory-centric requests operate on the most recent version of data, i.e., the dirty copies of the data stored in any of the L1 cache 120, the L2 cache 130 or the L3 cache 140, because the dirty copies will be stored to memory and the memory-centric requests will retrieve the dirty copies of data from the memory. Flushing/invalidating cache data in this manner also ensures that the results of the memory-centric requests will be retrieved from memory and used in any subsequent core-centric requests. An alternative dispatch flow is for the memory-centric requests to access the L1 cache 120, the L2 cache 130 and the L3 cache 140 on their way to the coherence directory controller 150 to check for copies of data for addresses corresponding to the memory-centric requests before accessing the coherence directory controller 150 to check for copies of the data in other memory structures in the system.

With either dispatch flow, the address checking performed by the coherence directory controller 150 and/or checking the L1 cache 120, the L2 cache 130 and the L3 cache 140 on their way to the coherence directory controller 150 consumes processing resources on the critical path of dispatching memory-centric requests to PIM or PNM devices and therefore directly affects dispatch throughput. This is performed for every memory-centric command, even those that do not access memory, because they are assigned the same physical address as other memory-centric requests from the same thread when being dispatched from the host to ensure proper routing to the completion point, such as a DRAM channel, even though such address checking is not needed for memory-centric commands that do not access memory. Physical addresses are typically assigned to memory-centric commands that access memory inside the CPU pipeline 110 when address translation is complete. For memory-centric commands that do not access memory, physical addresses are typically assigned when those commands are sent from the CPU pipeline 110 via the dispatch flow 190 to the coherence controller 150.

III. Bypassing Address Checking For Memory-Centric Commands That Do Not Access Memory According to an implementation, dispatch throughput of memory-centric requests is improved by bypassing address checking for memory-centric requests that do not access memory. Thus, the normal processing overhead required to perform address checking for memory-centric requests is selectively avoided for memory-centric requests that do not access memory. It is presumed that a synchronism mechanism is employed to maintain the order of core-centric and memory-centric requests, and also that memory-centric requests are completed before subsequent core-centric requests that use the results of the memory-centric requests are allowed to proceed.

As used herein, the term "Address Check Bypass (ACB) bit" refers to a bit value that indicates whether address checking should be bypassed, i.e., not performed, for a memory-centric request. According to an implementation, an unused or extra bit for memory-centric commands is used as an ACB bit and used throughout a system. Alternatively, an ACB bit value is specified as a new bit in an existing memory-centric command. Implementations are described herein in the context of an ACB bit being set to a value of "1" to indicate that address checking is to be bypassed, and a value of "0" to indicate that address checking should not be bypassed for purposes of explanation, but other implementations are not limited to this approach and use the opposite meaning.

According to an implementation, storage array controllers, such as a coherence directory controllers or cache controllers, include processing logic that is configured to bypass address checking for memory-centric commands that have their respective ACB bit set. For example, when the ACB bit for a particular memory-centric command is set, bypassing address checking provides the benefit that the memory-centric request does not need to access the coherence directory to perform the address checking and the coherence directory controller 150 does not issue the flush/invalidate requests 192 of FIG. 1. Also, the L1 cache 120, the L2 cache 130 and the L3 cache 140 do not have to process the flush/invalidate requests 192 or issue flush/invalidate responses 194 to the coherence directory controller 150. Similarly, overhead attributable to the cache controller for the L3 cache 140 performing address checking for memory-centric requests in the memory pipeline is avoided. Command processing logic in the cache controllers is configured to check the ACB bit value in memory-centric commands and bypass address checking when the ACB bit is set. According to an implementation, the ACB bit for core-centric commands is always reset so that normal address checking will be performed by default.

According to an implementation, an ACB bit value is specified in a memory-centric instruction. For example, for a memory-centric instruction that does not access memory, such as the "PIMmul" instruction of FIG. 2, the ACB bit is set in the memory-centric instruction, e.g., by adding a symbol such as "+" to the instruction "PIMmul," i.e., "PIMmul+" or the like. Similarly, for a memory-centric instruction that explicitly accesses memory, the ACB bit is reset, for example by the instruction not including the designated symbol. Alternatively, a parameter value, e.g., via a "1" or "0" is specified in the instruction.

According to an implementation, a software library includes memory-centric instructions or primitives with pre-specified ACB bits. Continuing with the prior example, a software library includes both PIMmul and PIMmul+ instructions. The PIMmul+ instruction is used when none of the arguments reference memory and the PIMmul instruction is used when any of the arguments reference memory.

Figure 2:
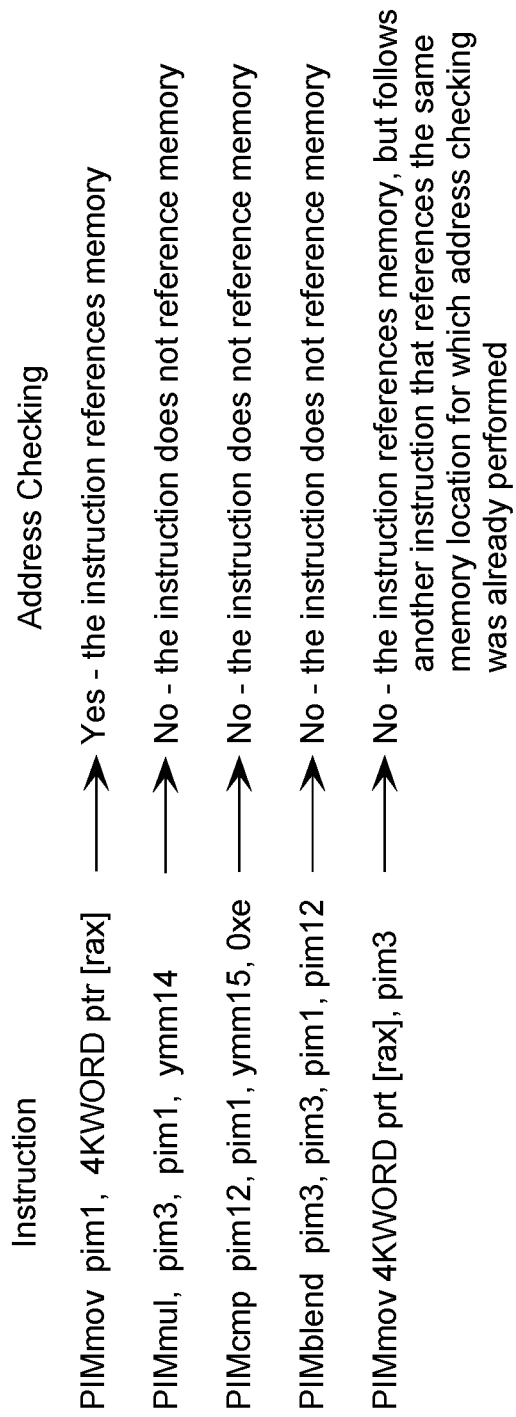
FIG. 2 depicts example pseudo code for a set of memory-centric instructions.

According to another implementation, ACB bit values are automatically specified by a process that processes memory-centric instructions. For example, a compiler determines whether any of the arguments for memory-centric instructions reference memory and automatically sets the ACB bit for memory-centric instructions that do not access memory and resets the ACB bit for memory-centric instructions that do access memory. In the example of FIG. 2, the compiler sets the ACB bit for the PIMmul, PIMcmp, and PIMblend instructions since they do not reference memory and resets the ACB bit for the first and last PIMmov instructions since they do reference memory.

According to another implementation, ACB bit values are specified by host hardware when memory-centric requests are issued. For example, dispatch hardware determines whether a memory-centric command references memory and automatically sets the ACB bit for a memory-centric command if it does not access memory and resets the ACB bit for a memory-centric command if it does access memory before issuing the memory-centric command into the memory pipeline.

IV. Bypassing Address Checking For Memory-Centric Commands That Do Access Memory According to an implementation, dispatch throughput of memory-centric requests is further improved by bypassing address checking for memory-centric requests that do access memory but follow another memory-centric request that accessed the same physical memory address. Thus, the normal processing overhead required to perform address checking for memory-centric requests is further selectively avoided for memory-centric requests that do access memory. In this implementation it is presumed that address checking was performed for the prior memory-centric request and data stored in caches for the physical address was flushed and/or invalidated.

FIG. 2 depicts example pseudo code for a set of memory-centric instructions and an indication of whether address checking is performed for each memory-centric instruction. In the example of FIG. 2, the memory-centric processing instructions to apply a function on a vector of elements for purposes of explanation, but implementations are not limited to this example. The PIMmul, PIMcmp, and PIMblend instructions do not access memory, but rather only local PIM registers, e.g., pim1, pim3, and pim12. The physical address that corresponds to the first PIMmov instruction is assigned to the memory-centric instructions PIMmul, PIMcmp, and PIMblend before being dispatched by the host to ensure that these memory-centric requests are routed to the same completion point, e.g., the same PIM device, as the first PIMmov memory-centric request.

In the example of FIG. 2, the first and last PIMmov instructions reference the same location in memory. The first PIMmov instruction reads data from the memory location, the intermediate instructions PIMmul, PIMcmp, and PIMblend update the data, and the last PIMmove instruction stores the updated data back to the same memory location. Address checking needs to be performed for the first PIMmov instruction because it explicitly references memory, so the ACB bit for the first PIMmov instruction is reset. Address checking does not need to be performed for the PIMmul, PIMcmp, and PIMblend instructions since they do not reference memory, so the ACB bit is set for these instructions. Since the first PIMmove command causes copies of the memory data to be flushed and/or invalidated from processor-side caches, addressing checking can be bypassed for the second PIMmov command. Therefore, in this situation, the ACB bit for the second PIMmov command is also set, even though the second PIMmov command references memory.

According to an implementation, addresses that have been flushed and/or invalidated are stored and used to determine whether to set the ACB bit for subsequent memory-centric commands. Implementations are described herein in the context of storing addresses in the address buffer 170 but are not limited to an address buffer. Address buffer 170 can be implemented by any type of buffer, such as a First-In-First-Out (FIFO) buffer.

When the storage array controller processes a new memory-centric command, the storage array controller determines whether the physical address for the new memory-centric command is stored in and/or represented in the address buffer 170. If so, then the storage array controller sets the ACB bit for the new memory-centric command since any data for that physical address stored in caches has already been flushed to memory and/or invalidated. If the physical address for the new memory-centric command is not stored in and/or represented in the address buffer 170, then the ACB bit for the new memory-centric command is reset since any data for that physical address stored in caches needs to be flushed to memory and/or invalidated. In addition, the physical address for the new memory-centric command is added to the address buffer 170.

According to an implementation, an address in the address buffer 170 is removed and/or invalidated when it matches the physical address of a core-centric request that installs a line in a cache. Addresses are maintained in the address buffer 170 individually, or in ranges of contiguous addresses to reduce the number of buffer entries. This allows pairs of entries in the address buffer 170 to represent a range of physical addresses that have already been flushed and/or invalidated, e.g., by specifying a start address and an end address for an address range. According to an implementation, addresses in the address buffer 170 are invalidated when a memory-centric code region is complete, for example after completion of the second PIMmov command of FIG. 2. The use of a buffer to store addresses that have been flushed and/or invalidated in this manner provides the benefit of bypassing address checking for memory-centric commands that access memory and for which address checking would otherwise be performed. Furthermore, according to an implementation, the address buffer 170 is used in multi-core (and multi-chiplet) architectures that are executing separate threads.

Figure 3:
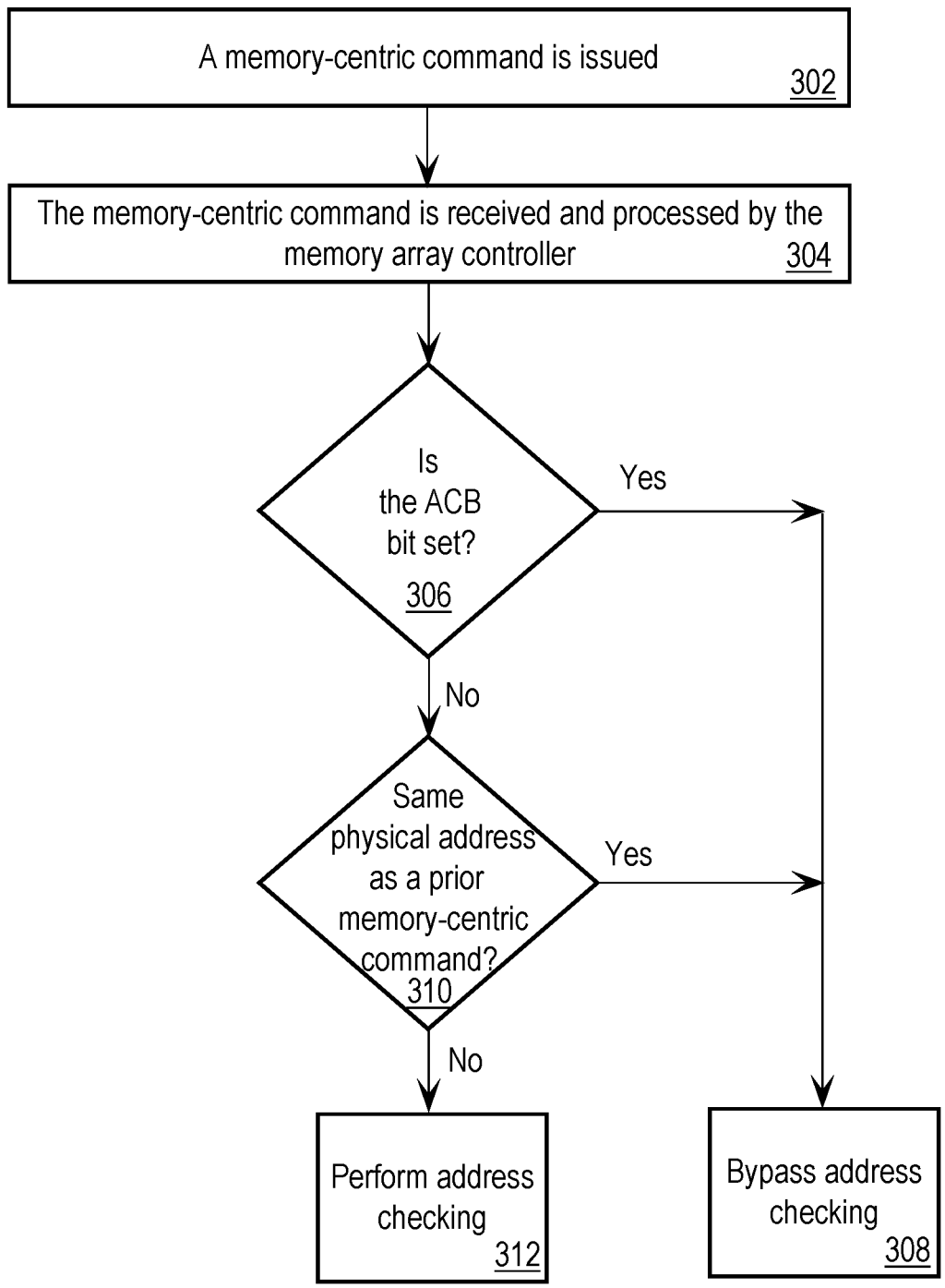
FIG. 3 is a flow diagram that depicts an approach for improving dispatch throughput of memory-centric commands.

FIG. 3 is a flow diagram 300 that depicts an approach for improving dispatch throughput of memory-centric commands. In step 302, a memory-centric command is issued into the memory pipeline. The memory-centric command has its ACB bit set via the corresponding memory-centric instruction, by a compiler, or by host hardware. For example, the ACB bit is set in a memory-centric instruction for a command that does not reference memory. As another example, a compiler or host hardware automatically sets the ACB bit in response to determining that the memory-centric command does not explicitly reference memory.

In step 304, the memory-centric command is received and processed by the storage array controller. In step 306, a determination is made whether the ACB bit for the memory-centric command is set. This can be accomplished, for example, by processing logic in the storage array controller examining bit values for the memory-centric command, applying a bit mask, etc. If the ACB bit for the memory-centric command is set, then address checking does not need to be performed for the memory-centric command and in step 308, address checking is bypassed for the memory-centric command.

If, in step 306, a determination is made that the ACB bit for the memory-centric command is not set, i.e., is reset, then the memory-centric command accesses memory and in step 310, a determination is made whether the memory-centric command has the same physical address as a prior memory-centric command. According to an implementation, the processing logic in the storage array controller checks whether address buffer 170 contains the physical address for the memory-centric command. The physical address can be explicitly listed in the address buffer 170 or be within a range of physical addresses in the address buffer 170. For example, in the situation previously described herein where in FIG. 2 the second PIMmov command accesses the same memory location as the first PIMmov command, the physical address is stored in and/or represented in and address range in the address buffer 170.

If in step 310, a determination is made that the memory-centric command has the same physical address as a prior memory-centric command, then control proceeds to step 308 and address checking is bypassed for the memory-centric command. As previously described herein, in this situation address checking can be bypassed because any copies of data that were stored in cache were flushed and/or invalidated when address checking was performed for the prior memory-centric command directed to the same physical address, e.g., the first PIMmov command.

If in step 310, a determination is made that the memory-centric command does not have the same physical address as a prior memory-centric command, then normal address checking is performed in step 312. Referring to the prior example, in the situation where the second PIMmov command has a different physical address than the first PIMmov command, then address checking cannot be bypassed for the second PIMmov command.

According to an implementation, dispatch throughput of memory-centric commands is further improved by a storage array controller that is configured to determine whether address checking should be performed for multiple memory-centric commands in parallel based upon address. In this implementation, a memory address space is logically divided into N number of address ranges, where each address range corresponds to a processor-enabled memory element, for example a PIM-enabled DRAM bank. Memory-centric commands are processed by a particular PIM-enabled DRAM bank based upon the corresponding address for each memory-centric command and the particular address mapping scheme used.

Processing logic in the storage array controller is configured to process memory-centric commands for the different address ranges in parallel. For example, suppose that a memory array is implemented by four PIM-enabled DRAM banks, where each PIM-enabled DRAM bank is mapped to a different address range of an address space. The storage array controller includes four sets of processing logic that each corresponds to one of the four address ranges. When a memory-centric command is received, the memory-centric command is processed by the set of processing logic that is designated, based upon the particular address mapping scheme used, to handle the address range that includes the address assigned to the memory-centric command. According to an implementation, the processing logic uses the same address mapping scheme as is used for the processing-enabled memory elements, i.e., the PIM-enabled DRAM banks. For example, the bits used to specify a PIM-enabled bank are used to select the set of processing logic to process the memory-centric command. The processing logic then determines whether address checking should be performed for the memory-centric command as previously described herein. According to an implementation, the number of sets of processing logic is the same as the number of processing-enabled memory elements, i.e., the number of PIM-enabled DRAM banks.

As additional memory-centric commands are received, they are directed to the sets of processing logic in the same manner. This allows memory-centric commands with addresses in different address ranges within the address space, and therefore different PIM-enabled DRAM banks, to have their respective address checking described above to be performed in parallel by their respective set of processing logic, leveraging the address checking bandwidth of the storage array controller. This provides the benefit of improved dispatch throughput commensurate with parallelism provided by the PIM-enabled DRAM banks. Successive memory-centric commands that have corresponding addresses mapped to the same address range within the address space, and therefore the same PIM-enabled DRAM bank, are processes serially.

What is claimed is:

1. A storage array controller at a processor, wherein the storage array controller is configured to:
   perform address checking for one or more processor-side caches for a first memory-centric command being dispatched to a memory device; and
   bypass the address checking for the one or more processor-side caches for a subsequent memory-centric command being dispatched to the memory device based on a condition.

2. The storage array controller of claim 1, wherein the storage array controller is one or more of a cache controller or a coherence directory controller.

3. The storage array controller of claim 1, wherein the address checking for the one or more processor-side caches includes determining whether the one or more processor-side caches store data that corresponds to the first memory-centric command.

4. The storage array controller of claim 1, wherein the storage array controller is further configured to examine one or more bit values in the subsequent memory-centric command, wherein the condition comprises the one or more bit values in the subsequent memory-centric command indicating that the address checking is to be bypassed for the subsequent memory-centric command.

5. The storage array controller of claim 4, wherein the one or more bit values in the subsequent memory-centric command are specified by one or more of a memory-centric instruction that corresponds to the subsequent memory-centric command, a compiler, or host hardware.

6. The storage array controller of claim 1, wherein the condition comprises a physical address for the subsequent memory-centric command being the same as a physical address for a prior memory-centric command for which the address checking was previously performed.

7. The storage array controller of claim 6, wherein the storage array controller is further configured to compare the physical address for the subsequent memory-centric command to stored physical addresses for a plurality of prior memory-centric commands.

8. The storage array controller of claim 7, wherein the storage array controller is further configured to add to the stored physical addresses the physical address for the first memory-centric command.

9. The storage array controller of claim 1, wherein the condition comprises the subsequent memory-centric command not accessing memory.

10. A microprocessor, wherein the microprocessor is configured to:
set, in response to a physical address for a memory-centric command being the same as a physical address for a prior memory-centric command for which the address checking was previously performed, a bit value to indicate to a storage array controller to bypass address checking for one or more processor-side caches for the memory-centric command.

11. A method comprising:
performing, by a storage array controller at a processor, address checking for one or more processor-side caches for a first memory-centric command being dispatched to a memory device; and
bypassing, by the storage array controller, address checking for the one or more processor-side caches for a subsequent memory-centric command being dispatched to the memory device based on a condition.

12. The method of claim 11, wherein the storage array controller is one or more of a cache controller or a coherence directory controller.

13. The method of claim 11, wherein the address checking for the one or more processor-side caches includes determining whether the one or more processor-side caches store data that corresponds to the first memory-centric command.

14. The method of claim 11, further comprising examining, by the storage array controller, one or more bit values in the subsequent memory-centric command, wherein the condition comprises the one or more bit values in the subsequent memory-centric command indicating that the address checking is to be bypassed for the subsequent memory-centric command.

15. The method of claim 14, wherein the one or more bit values in the subsequent memory-centric command are specified by one or more of a memory-centric instruction that corresponds to the subsequent memory-centric command, a compiler, or host hardware.

16. The method of claim 11, wherein the condition comprises a physical address for the subsequent memory-centric command being the same as a physical address for a prior memory-centric command for which the address checking was previously performed.

17. The method of claim 16, further comprising comparing, by the storage array controller, the physical address for the subsequent memory-centric command to stored physical addresses for a plurality of prior memory-centric commands.

18. The method of claim 17, further comprising adding, by the storage array controller, to the stored physical addresses, the physical address for the first memory-centric command.

19. The method of claim 11, wherein the condition comprises the subsequent memory-centric command not accessing memory.

* * * * *